(12) United States Patent  (10) Patent No.: US 7,671,712 B2
Elliott et al.  (45) Date of Patent: Mar. 2, 2010

(54) LEVITATION OF OBJECTS USING MAGNETIC FORCE

(75) Inventors: Todd S. Elliott, Portland, OR (US); William F. Hayhurst, Aurora, OR (US)

(73) Assignee: Ellihay Corp, Portland, OR (US)

( * ) Notice: Subject to any disclaimer, the term of this patent is extended or adjusted under 35 U.S.C. 154(b) by 174 days.

(21) Appl. No.: 11/388,537

(22) Filed: Mar. 23, 2006

(65) Prior Publication Data

US 2006/0214756 A1   Sep. 28, 2006

Related U.S. Application Data

(60) Provisional application No. 60/665,115, filed on Mar. 25, 2005.

(51) Int. Cl.
    *H01F 7/02* (2006.01)
(52) U.S. Cl. .................. 335/306; 335/209; 335/296; 335/302
(58) Field of Classification Search ......... 335/209–306
    See application file for complete search history.

(56) References Cited

U.S. PATENT DOCUMENTS

| | | | |
|---|---|---|---|
| 2,693,788 A | 10/1954 | Spatz | |
| 3,196,566 A | 7/1965 | Littlefield | |
| 3,278,011 A | 10/1966 | Viemeister | |
| 3,492,738 A * | 2/1970 | Simon | 33/344 |
| 3,589,300 A * | 6/1971 | Wipf | 104/281 |
| 4,022,474 A | 5/1977 | Breslow | |
| 4,178,707 A | 12/1979 | Littlefield | |
| 4,233,777 A | 11/1980 | Inoue | |
| 4,324,185 A * | 4/1982 | Vinson | 104/283 |
| 4,356,772 A * | 11/1982 | van der Heide | 104/282 |
| 4,382,245 A | 5/1983 | Harrigan | |
| 4,486,729 A | 12/1984 | Lee | |
| 4,543,067 A | 9/1985 | Wallen | |
| 4,805,761 A * | 2/1989 | Totsch | 198/619 |
| 4,886,778 A * | 12/1989 | Moon et al. | 505/166 |
| 4,901,456 A | 2/1990 | Cotutsca | |
| 4,991,836 A | 2/1991 | Joffe | |
| 5,052,968 A * | 10/1991 | Lodrick, Sr. | 446/134 |
| 5,126,317 A * | 6/1992 | Agarwala | 505/166 |
| 5,168,183 A * | 12/1992 | Whitehead | 310/12 |
| 5,182,533 A | 1/1993 | Ritts | |
| 5,188,555 A | 2/1993 | Zbegner | |
| 5,298,875 A * | 3/1994 | Laibowitz et al. | 335/216 |
| 5,319,336 A * | 6/1994 | Alcon | 335/296 |
| 5,322,469 A | 6/1994 | Tilbor | |
| 5,334,965 A * | 8/1994 | Dolgin | 335/216 |
| 5,404,062 A | 4/1995 | Hones et al. | |
| 5,462,472 A | 10/1995 | Lin | |

(Continued)

OTHER PUBLICATIONS

International Search Report and Written Opinion of the ISA; Issued in foreigh counterpart application PCT/US06/10767; Aug. 9, 2007; 7 pages.

*Primary Examiner*—Elvin G Enad
*Assistant Examiner*—Mohamad A Musleh
(74) *Attorney, Agent, or Firm*—Hancock Hughey LLP

(57) ABSTRACT

The invention disclosed is a method of levitating one or both ends of an object permanently or temporarily, or altering the distance between two objects or the momentum of an object by manipulating the direction of the magnetic field of a permanent or electromagnet.

13 Claims, 8 Drawing Sheets

U.S. PATENT DOCUMENTS

| | | |
|---|---|---|
| 5,463,826 A | 11/1995 | Horiuchi |
| 5,506,459 A | 4/1996 | Ritts |
| 5,517,924 A * | 5/1996 | He et al. .................. 104/286 |
| 5,559,384 A * | 9/1996 | Boland et al. ............. 310/90.5 |
| 5,589,721 A * | 12/1996 | Han et al. ................. 310/90.5 |
| 5,685,096 A | 11/1997 | Horiuchi |
| 5,726,512 A * | 3/1998 | Chu et al. ................. 310/90.5 |
| 5,931,714 A | 8/1999 | Johnson |
| 5,974,977 A | 11/1999 | Johnson |
| 6,413,138 B1 | 7/2002 | Dokoupil |
| 6,483,222 B2 * | 11/2002 | Pelrine et al. ............. 310/268 |
| 6,608,540 B1 * | 8/2003 | Hones et al. ............... 310/90.5 |
| 6,655,058 B2 | 12/2003 | Brooks, III |
| 6,719,605 B2 | 4/2004 | Ichikawa |
| 6,739,938 B2 | 5/2004 | Dokoupil |
| 6,761,610 B2 | 7/2004 | Fisher et al. |
| 6,850,137 B2 * | 2/2005 | Bird et al. ................. 335/216 |
| 6,894,592 B2 * | 5/2005 | Shen et al. ................. 335/78 |
| 2003/0176144 A1 * | 9/2003 | Fisher et al. ............... 446/133 |
| 2006/0028751 A1 * | 2/2006 | Takeuchi .................... 360/55 |
| 2006/0044094 A1 * | 3/2006 | Davis et al. ................ 335/220 |
| 2006/0113932 A1 * | 6/2006 | Mori et al. ................. 318/114 |

* cited by examiner

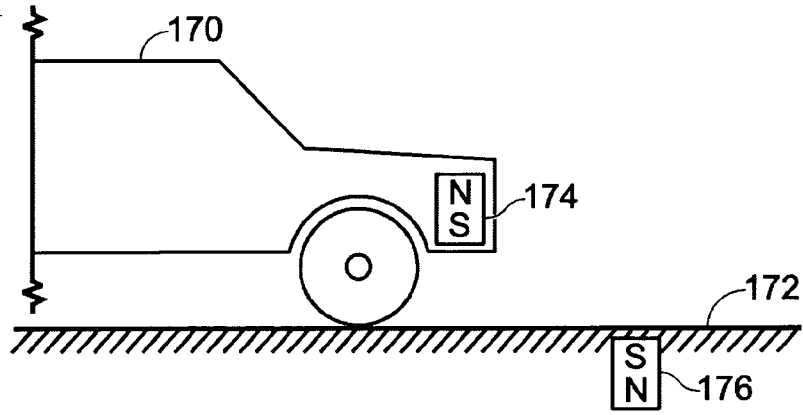
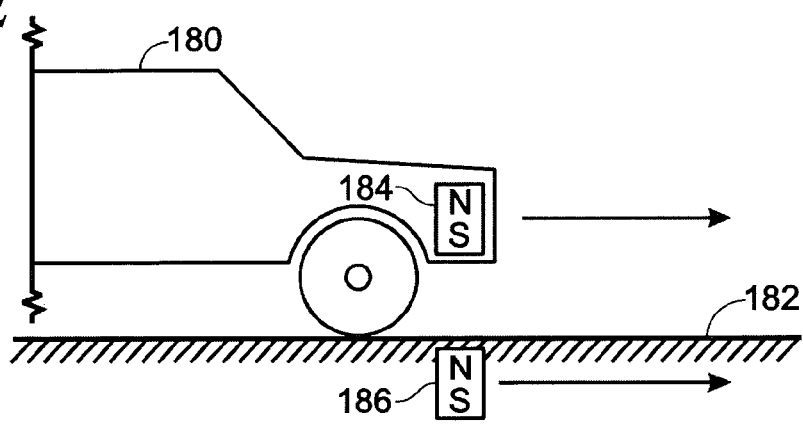
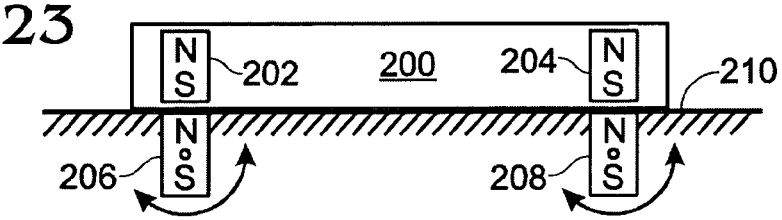
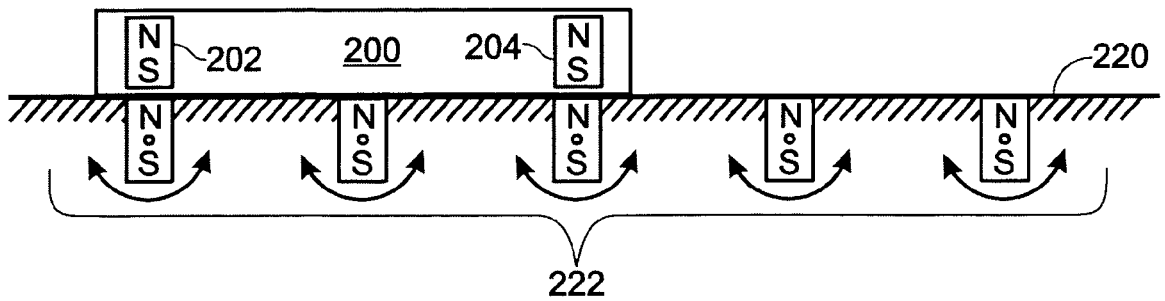

LEVITATION OF OBJECTS USING MAGNETIC FORCE

TECHNICAL FIELD

This application relates to levitating objects by manipulating the orientation of the magnetic field of a permanent magnet or electromagnet.

BACKGROUND

Magnets contain properties commonly known for centuries. Magnets contain two poles, one north (N) and one south (S). Opposite poles attract, and like poles repel.

Magnetic fields have long been used in various applications. Magnetic attraction forces can provide utility by temporarily securing items to a ferromagnetic surface or by orienting items in ways to increase their functionality. Many products can utilize the repulsive force of two or more magnets to create novel designs for consumer products.

Mechanical gears and motors are often used to move objects. Wear and tear or overloading of these components, however, can cause them to stop working. A static or changing magnetic field can be used as a driving force in place of, or in conjunction with, mechanical gears and motors, thereby extending the life of a product.

In devices that employ magnetic attraction, magnets creating attracting forces by a pole arrangement of N-S can be substituted for magnets having pole arrangements of S-N. In devices that employ magnetic repulsion, magnets creating repulsive forces by a pole arrangement of N-N can be substituted for magnets having pole arrangements of S-S.

SUMMARY OF THE INVENTION

The invention disclosed is a method of permanently or temporarily levitating one or both ends of an object, or altering the distance between two objects, or the momentum of an object, by manipulating the direction of the magnetic field of a permanent or electromagnet.

One preferred embodiment is a method to secure an object in a manner to give the appearance of levitation of either one end of the object or the object as a whole. One end of the object is permanently or temporarily fixed by mechanical or magnetic means while the other end is free to levitate or "float" in midair. By fixing one end, the overall stability of the object is significantly increased, such that imparting small movements to the object will not cause the object to dislodge. Proper design of the securing structure will allow the object to oscillate when force is applied to the object either intentionally or unintentionally, or when the magnetic field is altered, thereby potentially enhancing the appeal of the object.

Another embodiment of the invention teaches a method to provide motion of one or more parts of an object by manipulation of a magnetic field. Rotating a permanent magnet or switching the direction of current in the wire of an electromagnet will cause a change of direction of a magnetic field, thus alternating the force on a nearby magnet between repulsive and attractive.

Other advantages and features of the present invention will become clear upon study of the following portion of this specification and drawings.

BRIEF DESCRIPTION OF DRAWINGS

FIGS. 21 and 22 are diagrams illustrating how magnetic fields are manipulated in accordance with the present invention for accelerating an object that is, preferably, embodied as a vehicle.

FIGS. 23-25 are diagrams for illustrating another method for moving an object by altering magnetic fields.

DESCRIPTION OF PREFERRED EMBODIMENTS

With reference to FIGS. 1-11 a first, preferred embodiment of a method and assembly for providing full and partial levitation of an object without mechanically generated movement is described next.

Figure 1:
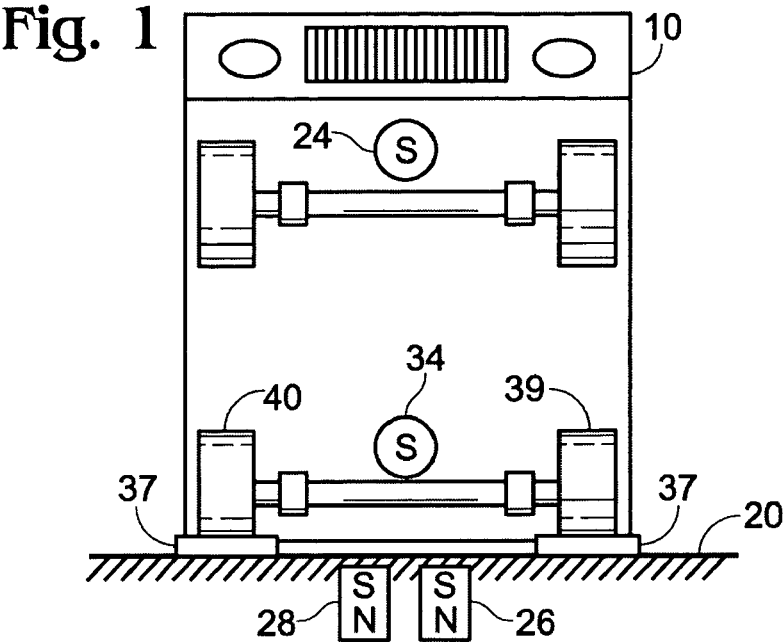
FIG. 1 is a front elevation view of an object that is partially levitated in accordance with one aspect of the present invention.
Figure 2:
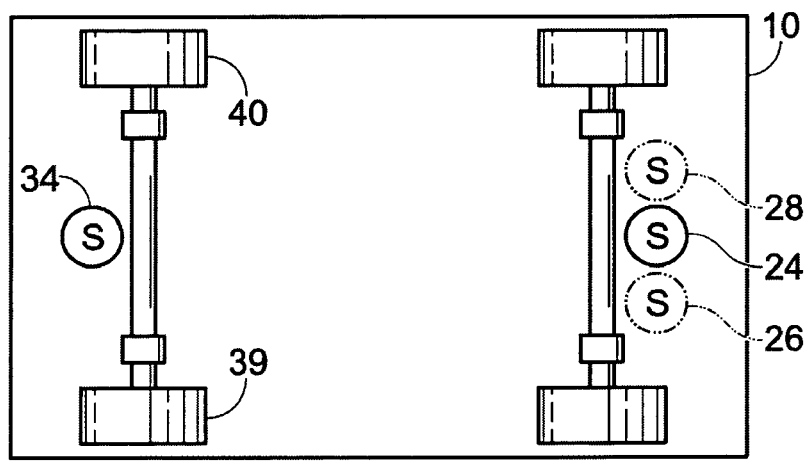
FIG. 2 is a bottom plan view of the object of FIG. 1, prior to its levitation.
Figure 3:
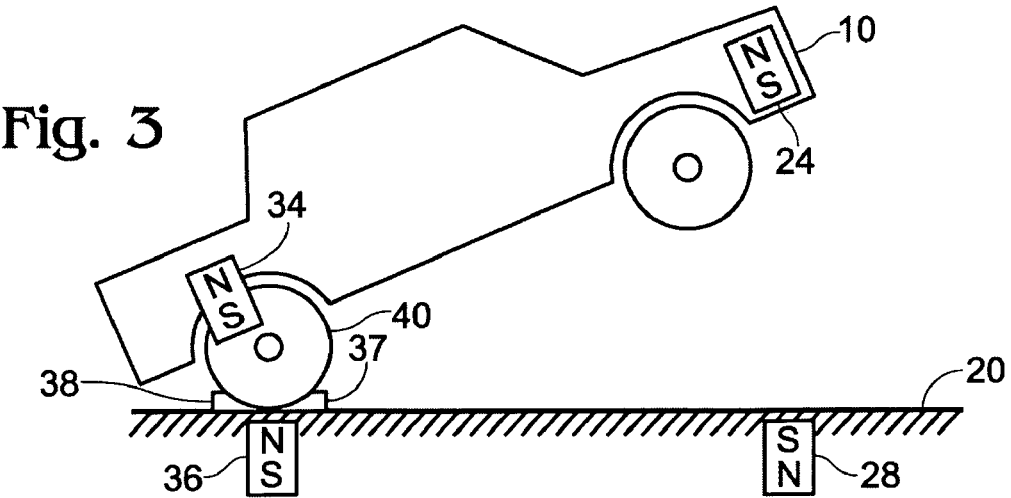
FIG. 3 is a right elevation view of the object of FIG. 1.

FIGS. 1-3 present a vehicle 10 with the front end levitated. Magnet 24 is located inside the body or attached on the surface of the vehicle 10. Magnets 28 and 26 are located on or below the surface of base 20. The south-pole end of magnet 24 is oriented downward toward magnets 28 and 26, which have their south-pole ends pointing upward. This arrangement provides a repulsive force between magnet 24 in the vehicle and the two magnets 28 and 26 in the base. Magnets 24, 28 and 26, if chosen properly create a magnetic repulsive force that is more powerful than the force of gravity acting on the mass of the vehicle.

A channel is created by wedges 37, 38 on the surface of the base 20. The wedges serve to locate one pair of the vehicle's wheels 40 and 39 and magnet 34 directly above magnet 36 in the base 20. Magnet 36 is located on or below the surface of base 20. Magnet 34 is located inside the body or attached on the surface of the vehicle 10. Magnet 36 is located on or beneath the surface of base 20. The north-pole end of magnet 34 is oriented above south-pole end of magnet 36. This arrangement provides an attractive force between those two magnets. Locating magnet 34 in the same vertical plane as wheels 40 and 39 and in close proximity to the vertical position of the central axis of wheels 40 and 39 will insure that the axis of rotation of vehicle 10 will be at or near the point of contact between wheels 40 and 39 and base 20. Magnets 34 and 36 of proper strength can create enough attractive force to keep the vehicle from sliding or twisting away from the repulsive force at the opposite end of the vehicle.

Magnets 24, 28, 26, 34 and 36 arranged as shown in FIGS. 1-3 will allow the levitation of either end of the vehicle depending on the orientation of the vehicle. It would be apparent to one skilled in the art of mechanical design that a groove cut into surface 20 would produce the same effect as the channel created by raised wedges 37 and 38.

Figure 4:
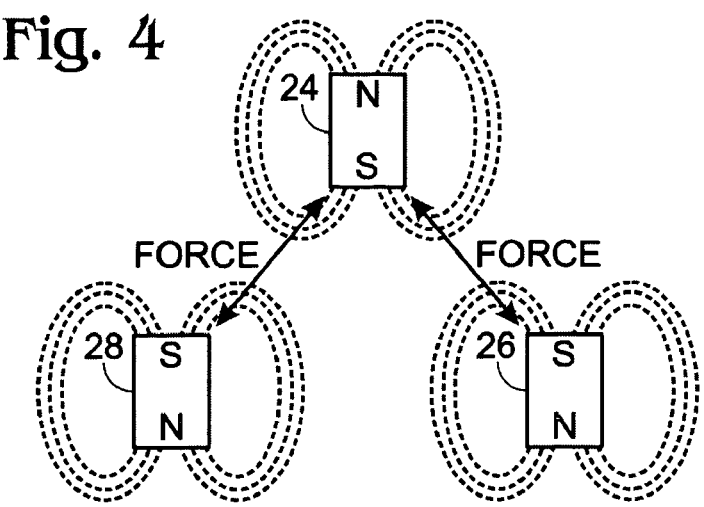
FIG. 4 is an illustration of the interaction of the magnetic fields employed in the embodiments of FIGS. 1-3.

FIG. 4 depicts a preferred arrangement of magnets to provide stable float to an object. Magnet 24 is oriented with the magnetic north pole pointing up. Magnets 28 and 26 are oriented with magnetic south poles pointing up. This arrangement creates a repulsive force between magnet 24 and magnets 28 and 26. Magnets 28 and 26 located a distance apart creating two points of maximum magnetic field on either side of magnet 24. This arrangement creates a valley of lower magnetic field in the center, thus creating a preferred resting point for the levitated object. If the object is moved to one side or the other, the repulsive magnetic force will push the object back towards the center, thus providing more stability to the floating object.

Referring to FIG. 4 it would be apparent to a skilled designer that identical float characteristics to the design with two magnets 28, 26 in the base and one magnet 24 in the object would be created if the arrangement is inverted. If two magnets 28 and 26 are located inside the object and one magnet 24 is located inside the base similar peaks and valleys of interacting magnetic fields will be created. The alternative inverted orientation can be applied to all variations depicted in FIGS. 1-11.

It would be apparent to a person skilled in the art of product design that the method described in the detailed description of this invention is not the only arrangement that will produce the desired floating effect. Magnets in various orientations including but not limited to square and round bar magnets, torus shaped magnets and lines of smaller magnets can produce a repulsive force levitating the front end of the vehicle, as long as similar magnetic poles are facing each other. Similarly magnets in various orientations including but not limited to square and round bar magnets, torus shaped magnets and lines of smaller magnets can produce an attractive force fixing the rear end of the vehicle, as long as dissimilar magnetic poles are arranged to be facing each other. Various physical means could be utilized to fix the rear end of the vehicle including but not limited to hooks, screws, nuts and bolts, hinges, posts, and tethers.

It would be apparent to a person skilled in the art of product design that vehicle 10 could be an object other than a car or truck including but not limited to skateboards, motorcycles, bicycles, boats, wave runners, snowmobiles, etc.

Figure 5:
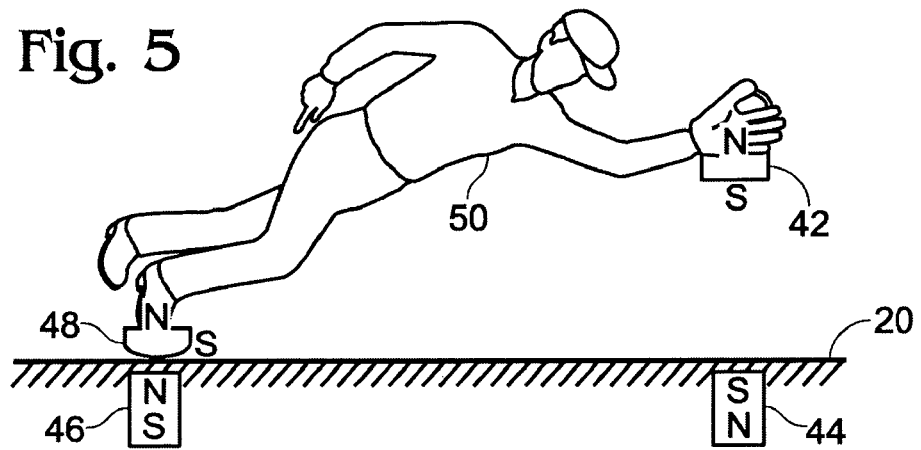
FIG. 5 is a side view of a decorative figure that is levitated in accordance with the present invention so that it appears to be in the act of diving to catch a ball.

FIG. 5 illustrates a figure of an athlete catching a ball. Magnet 42 is mounted on the surface or inside the figure, and magnet 44 is mounted on or under the surface of base 20. These magnets are oriented to create a repulsive force between the ground and the athlete's hand. Magnet 46 is mounted on or under the surface of base 20 and magnet 48 is mounted in the foot of the figure to fix the figure's foot to the ground and keep the figure from rotating out of position. That is, the connection between the surface and foot secures the object while allowing rotation at that connection point. The figure 50, therefore, is free to swing or oscillate slightly in reaction to any external forces (such as a person gently touching the object or rocking the base 20).

It would be obvious to a skilled designer that the figure would not need to be an athlete or even a human figure; a super hero could be made to appear to fly, a palm tree appear to blow in a hurricane, or a cat could be in the act of pouncing on a mouse. Levitation magnets and end-locating methods described in other portions of this description a later section would apply equally well to figures as to vehicles and other objects.

Figure 6:
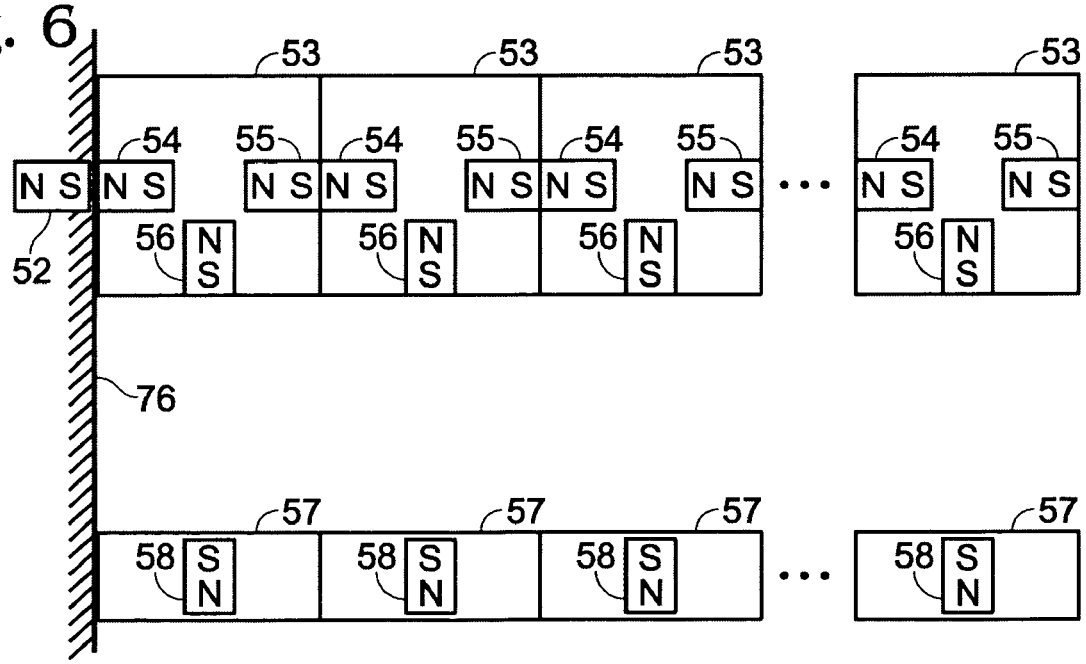
FIG. 6 is a diagram showing from the side a partially levitated display device.

FIG. 6 illustrates a novel display device. Magnet 52 is mounted on or under the surface of vertical structure 76. Magnet 54 inside object 53 is oriented to create an attractive force connecting vertical structure 76 and object 53.

Magnet 58 on or under the surface of base piece 57 is oriented to create a repulsive force with the magnet 56 that is inside object 53. Magnet 55, inside object 53, provides a method to attach an additional object 53 utilizing an attractive force between internal magnets 54 and 55. Any number of objects 53 can be attached end to end to create a structure that has one end levitated. Magnet 55 in object 53 would not be necessary if a single object 53 is to be levitated. The end object 53 not attached to vertical surface 76 in a floating chain of objects 53 would not require magnet 55. Magnet 56 could also be a torus magnet mounted in an orientation that creates repulsion between magnet 56 and magnet 58. A plurality of base pieces 57 can be added to ensure that the chain of objects 53 remain floating above the base pieces. It would be apparent to a person skilled in the art of product design that object 53 can be cubical, spherical, or any other geometric shape. For example, the end of the object 53 abutting vertical structure 76 could be curved to enable slight rocking motion of that object (as well as any additional objects attached thereto) against the surface 76 to which it is attracted. The orientation depicted in FIG. 6 allows rotation along the axis of the chain of objects 53. Also, the magnets 52, 54, and 55 could be oriented in the vertical direction to resist rotation of the chain of objects 53. It would also be apparent that ornament designs can be added to vertical structure 76, base 57 and object 53. Object 53 can display pictures, letters, or color combinations to enhance appearance and utility.

Figure 7A:
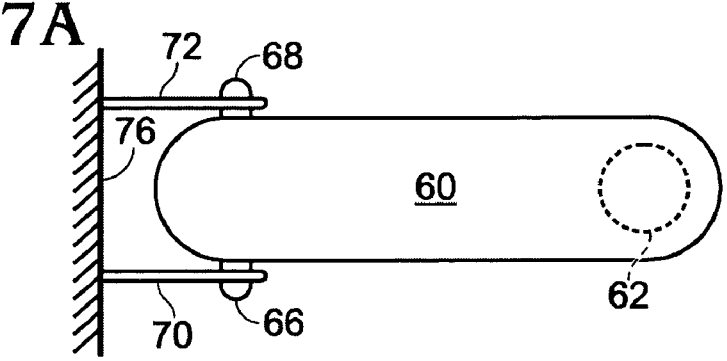
FIGS. 7A and 7B are diagrams showing in a top view (7A) and side view (7B) a board embodiment with one end levitating and the other end fixed to a vertical structure by hooks.
Figure 7B:
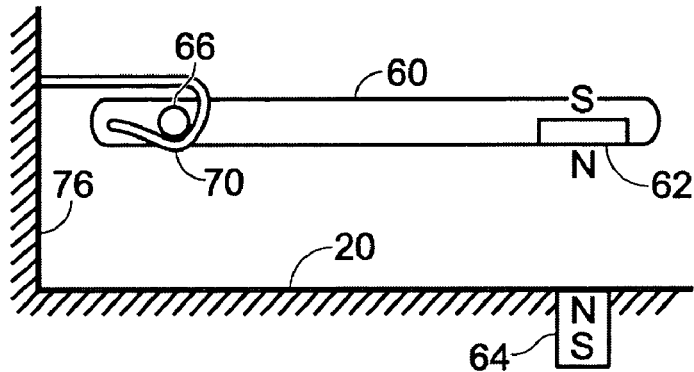

A vertical structure attached to the base can also act as an anchor point for mechanical or magnetic methods of fixing an object in a position. FIGS. 7A and 7B depict a board 60 levitating above base 20 (FIG. 7B). Magnet 62 on the surface of board 60 or inside board 60 is located at the free or distal end of the board and oriented to create a repulsive force against magnet 64 mounted on or under the surface of base 20. Vertical structure 76 anchors hooks 70 and 72 which hold pegs 66 and 68 attached to board 60. Levitation magnet and end locating methods described in a later section function similarly whether attached to vertical structure 76 or base 20.

Figure 8:
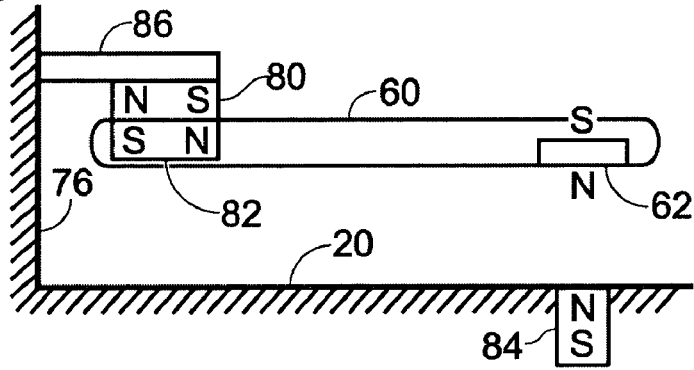
FIG. 8 is a diagram showing from the side a board with one end levitating and the other end connected under a cantilevered member.

FIG. 8 illustrates a method to attach board 60 without a supporting structure below board 60. Magnet 62 on the surface of board 60 or inside board 60 is located at the free or distal end of the board and oriented in a way that will create a repulsive force against magnet 84 mounted on or under the base 20. Magnet 82 on the surface of board 60 or inside board 60 is located at the proximal end of the board and oriented to create an attractive force with magnet 80 mounted on or under the surface of cantilevered member 86. Board 60 will stay in a levitating position above surface 20 without any support from below. Preferably the orientation of magnets 80 and 82 is such that both sets of opposite poles are engaged so that the attractive force between those magnets also ensures that the object 60 will not swing out of alignment (that is, into or out of the plane of the figure), thereby centering the object 60 over magnet 84. It is noteworthy that although the magnet 62 is shown in FIG. 8 at the distal end of the object 62, it is contemplated that the magnet 62 (as well as underlying magnet 84) could be located nearer the other end of the object, such as at the midpoint of the object 60. It is also noteworthy that the magnets 62 and 84 could, alternatively, be oriented so that both sets of like poles are aligned to thus produce a relatively strong repulsive magnetic force between them.

Figure 9:
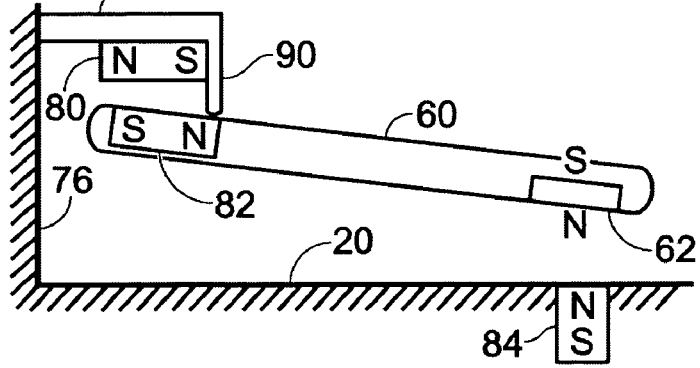
FIG. 9 is a diagram showing from the side an alternative design to that shown in FIG. 8 and that provides enhanced oscillation of a levitated object.

FIG. 9 represents a method to increase oscillations at the levitated, distal end of board 60, which is attached to a supporting structure above board 60. Magnet 62 on the surface of board 60 or inside board 60 is oriented to create a repulsive force against magnet 84 mounted on or under the base 20. Magnet 82 on the surface of board 60 or inside board 60 is located at the distal end of the board and oriented to create an attractive force with magnet 80 mounted on or under the surface of cantilevered member 86. Member 90 extends down from cantilevered member 86 to create a contact point or fulcrum between the board 60 and the supporting structure. The axis of rotation of board 60 will be located at or near the contact point between board 60 and member 90. If a force is applied to impart momentum to the levitating end of board 60 by a user tapping the board, by the switching of magnetic field orientation of magnet 84, or other means, board 60 will oscillate freely about the fulcrum until friction slows the movement. It would be apparent to someone skilled in mechanical design that member 90 could be any structure that extends below the bottom surface of member 86 and magnet 80. As shown in FIG. 9, the magnets and member 90 are arranged so that the direction of rotation of the board in response to the repulsive force of magnets 62 and 84 at the distal end of the board is opposite to the direction of rotation of the board in response to the attractive force of magnets 80, 82 at the proximal end of the board.

Figure 10:
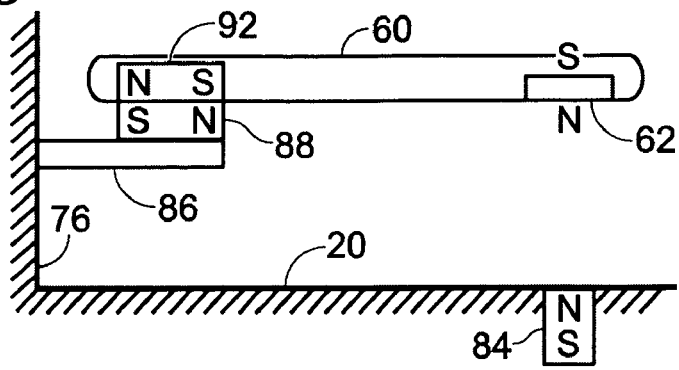
FIG. 10 is a diagram showing from the side a board with one end levitating and the other end connected above a cantilevered member.

FIG. 10 illustrates a method to attach board 60 providing the appearance of board 60 launching off vertical structure 76 or cantilevered member 86. Magnet 62 on the surface of board 60 or inside board 60 is located at the distal end of the board and oriented to a repulsive force against magnet 84 mounted on or under the base 20. Magnet 92 on the surface of board 60 or inside board 60 is located at the proximal end of the board and oriented to create an attractive force with magnet 88 mounted on or under the surface of cantilevered member 86. Board 60 will stay in a levitating position above surface 20 giving the appearance of launching into the air from vertical structure 76 or cantilevered member 86. Preferably the orientation of magnets 88 and 92 is such that both sets of opposite poles are engaged so that the attractive force between those magnets also ensures that the object 60 will not swing out of alignment (that is, into or out of the plane of the figure), thereby centering the object 60 over magnet 84. It is noteworthy that the magnets 62 and 84 could, alternatively, be oriented so that both sets of like poles are aligned to thus produce a relatively strong repulsive magnetic force between them.

Figure 11:
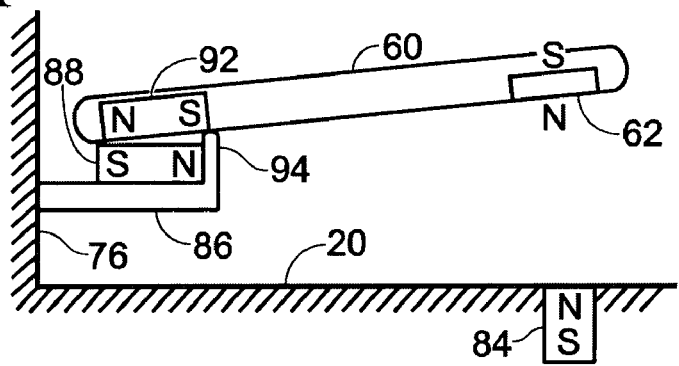
FIG. 11 is a diagram showing from the side an alternative design to that shown in FIG. 10.

FIG. 11 represents a method to increase oscillations at the levitated end of board 60 and provide the appearance of board 60 launching off vertical structure 76 or cantilevered member 86. Magnet 62 on the surface of board 60 or inside board 60 is oriented to create a repulsive force against magnet 84 mounted on or under the base 20. Magnet 92 on the surface of board 60 or inside board 60 is oriented to create an attractive force with magnet 88 mounted on or under the surface of cantilevered member 86. Member 94 extends up from cantilevered member 86 to create a contact point or fulcrum between the board 60 and the supporting structure. The axis of rotation of board 60 will be located at the contact point between board 60 and member 94. If momentum is produced in the levitating end of board 60 by a user tapping the board, switching of magnetic field orientation of magnet 84 or other means, board 60 will oscillate freely about the fulcrum until friction slows the movement or additional momentum is produced. It would be apparent to someone skilled in mechanical design that member 94 could be any structure that extends above the upper surface of member 86 and magnet 88. It would also be apparent to someone skilled in mechanical design that member 94 could be a structure incorporated into board 60 that extends below the bottom of the majority of the surface of board 60 to create a contact point that encourages oscillation of board 60. As shown in FIG. 11, the magnets and member 94 are arranged so that the direction of rotation of the board in response to the repulsive force of magnets 62 and 84 at the distal end of the board is the same as the direction of rotation of the board in response to the attractive force of magnets 88, 92 at the proximal end of the board.

Referring to FIGS. 1-15, it is contemplated that there are a variety of arrangements of magnets in the levitating end, and at the relatively fixed end of the various objects that will provide the same effect as described above. Also, levitation can be accomplished by methods including: a single pair of cylindrical, rectangular, torus shaped, or square magnets oriented in the horizontal or vertical directions, or multiple pairs of cylindrical, rectangular, torus shaped, or square magnets, and electromagnets oriented to create and attractive force at the fixed end and a repulsive force at the levitated end.

Referring to FIGS. 1-11 the fixed end must overcome horizontal and rotational forces imparted to the object by the magnetic force, however some designs utilizing torus-shaped magnets or a circular array of magnets can allow rotation along the axes perpendicular to the attachment point. It would be apparent to a skilled designer that a variety of methods could be used to fix the end to overcome the forces imparted on the levitated end. Many magnet configurations will fix one end to the base or vertical structure to keep the object in the desired position including a single pair of cylindrical, rectangular, torus shaped or square magnets oriented in the horizontal or vertical directions, or multiple pairs of cylindrical, rectangular, torus shaped or square magnets oriented to produce an attractive force. Mechanical connections can also fix the object to the base or vertical structure, including hooks attached to the base or back vertical structure engaging a rod attached to the object or directly to the object, one or more tension members connecting the object to the base or vertical structure, mating clevis and clevis pin combinations and mechanisms that clamp to the object or parts connected to the object. The geometry of the base or vertical structure can also hold the object against the forces generated by the magnets, such geometries including grooves or indentions for the wheels, back and side retaining walls, elevated bumps blocking wheel rotation, single or multiple studs attached to the vertical structure or base that mate with an open portion of the object or restrict movement of an extrusion on the object. It would also be apparent that the vertical surface 76 does not need to be flat and could be curved in any plane to increase function (for example, to facilitate rocking motion of the "fixed" end of the object, or to enhance aesthetic appeal.

Referring to FIGS. 1-15, it would also be apparent to someone skilled in the art of designing consumer products that the invention could be applied to a wide variety of objects including but not limited to: pens, cosmetic containers, wheeled vehicles, a wide variety of boards such as skateboards and snowboards, airplanes, UFO's, figures including humans, monsters, animals and plants, flashlights, phones, remote controls, eating utensils, etc. Ornamental objects can be added to support structure or the base to enhance aesthetics or floating effect.

Referring to FIGS. 1-15 it would be apparent to someone skilled in the art of designing consumer products that magnet locations can be moved to match design criteria to produce maximum float (levitation) or maximum oscillation of the free end of the object. Less powerful magnets can be placed at the extreme ends of the object to take advantage of the long lever arm to produce float. A more powerful magnet can be placed closer to the point of rotation to create an appearance of higher float. Magnets could be placed anywhere along the length of the object to produce a variety of float characteristics. Referring to FIG. 5 it would be apparent that attractive magnets 48 and 46 could be strong enough to fix FIG. 50 to the base without need for levitation magnets. Referring to FIG. 6 it would also be apparent that attractive magnets 52 and 54 could be strong enough to fix object 53 to the base without need for levitation magnets. Referring to FIGS. 8-11 it would also be apparent that attractive magnets 80 and 99 could be strong enough to fix the object 60 to the base without the need for levitation magnets.

Another advantage of the invention is the potential to make everyday objects easier to grab for persons with low levels of manual dexterity, or robots in a home or factory setting. Yet another advantage of the present invention derives from the ability to keep one end of an object from touching a surface. For example, a toothbrush can be floated in an orientation that will keep the bristles from touching a counter top or other surface that may contain germs, this orientation thus leading to higher levels of hygiene and potentially less illness. A cooking utensil can be floated above a counter to decrease mess, increase hygiene and enable a user to grasp the utensil more easily.

In another embodiment of the invention magnetic fields can be manipulated to create motion in one or more portions of an object. The force between two magnets can be changed from attraction to repulsion by switching the polarity of one of the magnets. The polarity of a permanent magnet is changed by rotating the magnet in a manner that exchanges position of its poles. The polarity of an electromagnet is changed by reversing the direction of the current passing through the coils.

Figure 12:
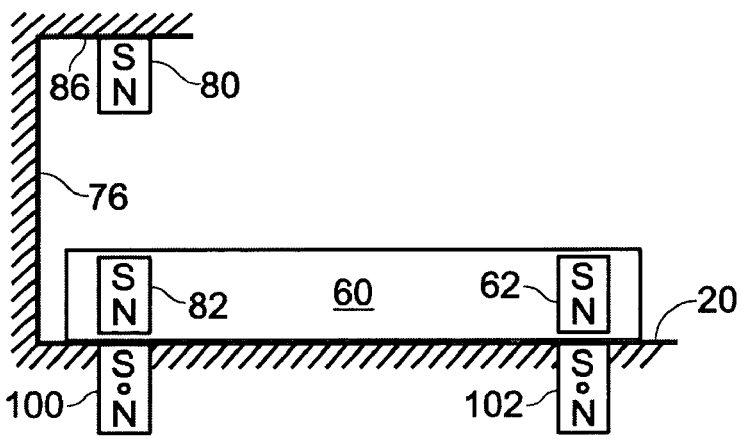
FIGS. 12-15 are diagrams showing from the side various implementations of the object levitation methods of the present invention.
Figure 13:
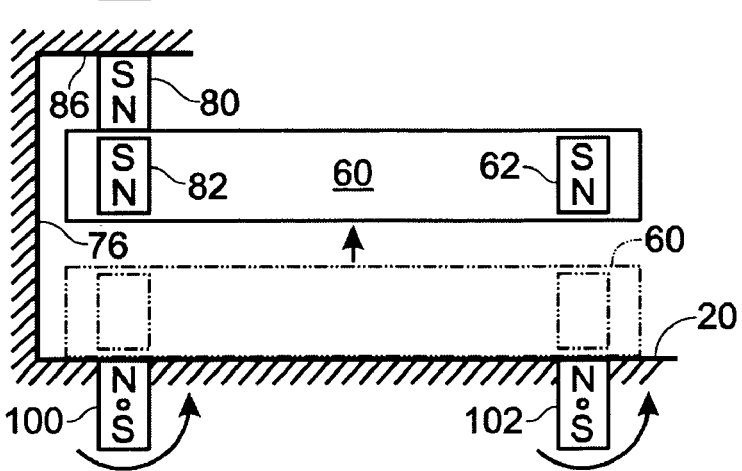

FIGS. 12 and 13 demonstrate a method to manipulate board 60 containing magnets 62 and 82 utilizing rotatable magnets 100 and 102. FIG. 12 depicts an arrangement where board 60 rests on base 20. Magnets 100 and 102 are oriented in a manner that they are attractive to magnets 82 and 62, respectively. FIG. 13 depicts an arrangement where magnets 100 and 102 have been rotated to switch their polarity. Board 60 is levitated at one end by the repulsive arrangement of magnets 62 and 102. The other end is of board 60 is held above base 20 to cantilever member 86 without a supporting structure below board 60 by the attractive force between magnets 80 and 82 and the repulsive force between magnets 82 and 100. If magnets 62, 80, 82, 100 and 102 are the appropriate strength and polarity, the act of rotating magnets 100 and 102 will cause the board to move from the base 20 to cantilever member 86. Continued rotation of magnets 100 and 102 will overcome the attraction between magnets 80 and 82 and cause board 60 to return to base 20 (FIG. 12). The individual ends of board 60 can be raised and lowered independently by rotating magnets 100 or 102 asynchronously. Magnets 100 and 102 could be electromagnets and provide performance similar to that provided by permanent magnets.

Figure 14:
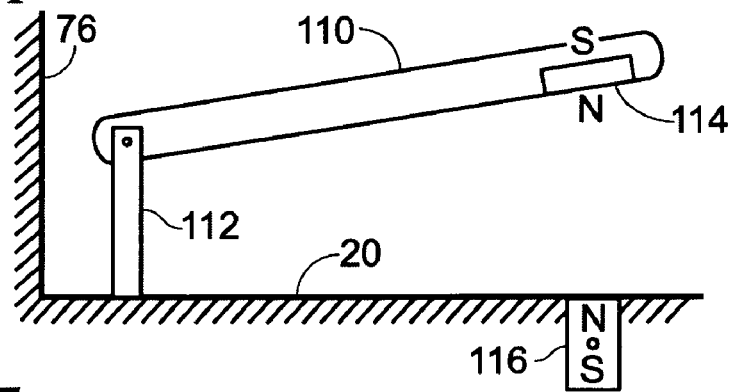
Figure 15:
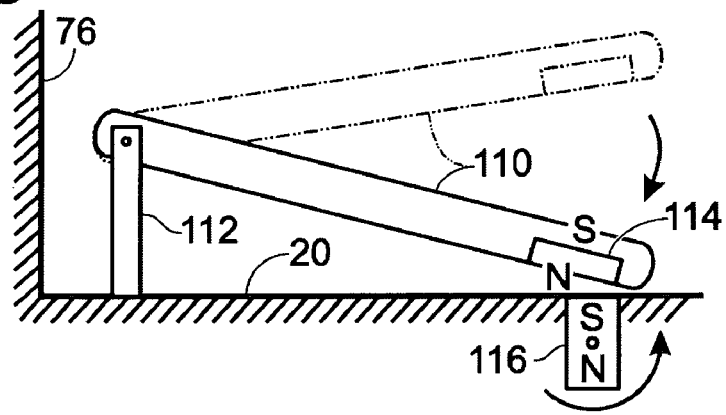

FIGS. 14 and 15 demonstrate a method to control the actions of member 110 by manipulating force between magnets 114 and 116. By rotating magnet 116 the force between magnets 114 and 116 will shift between attraction and repulsion thus causing upward (repulsive force) or downward (attractive force) movement of the free end of member 110. The up and down movement of member 110 can be purely aesthetic or novelty, but it can also have functional purpose. Functional uses include, but are not limited to, raising or launching an item placed on the free end or member 110 similar to a person launching off a diving board, closing an electric circuit traveling along member 110 to a contact node, or opening and closing the bottom surface of a box to allow the contents to empty. Member 110 can be mounted as shown to member 112 or to the face of a vertical structure 76. Member 110 can be hinged to allow for rotation, or a flexible material can be used that will allow member 110 to flex. A spring could be added to return member 110 to a preferred position such as horizontal. Member 110 could also be fixed to a vertical structure 76 or column 112 in a preferred position such as horizontal, if the material is chosen correctly, the resiliency of the material will return the member 110 to the preferred position. Magnet 116 could be an electromagnet and provide performance similar to that provided by a permanent magnet.

Figure 16:
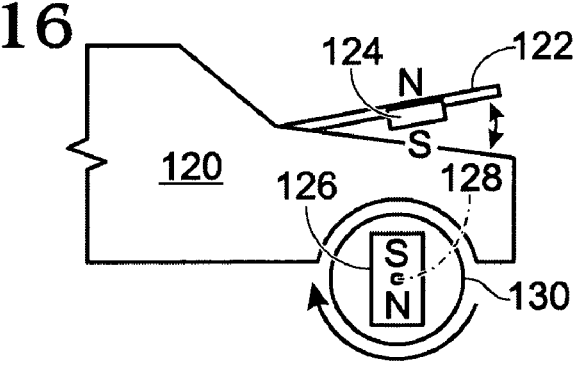
FIGS. 16-20 are diagrams showing side an aspect of the invention whereby the object that undergoes levitation is embodied as a vehicle.

FIG. 16 depicts a method for a novelty design of a vehicle 120 with a moving hood 122. Magnet 126 mounted on axle 128 rotates with wheel 130 as vehicle 120 moves forward or backward. The rotation of magnet 126 causes direction of the magnetic field to flip, thereby causing the force between magnets 124 and 126 to alternate between attraction and repulsion, so that the hood will raise and lower. Magnet 124 does not need to be attached to the hood 122 itself, but could be attached to a mechanical linkage connecting magnet 124 to hood 122. It would also be apparent to a designer that this action could be expanded to any other portion of a vehicle, trunk, doors, top, fins, mechanical arms, linkages or figures. The apparatus could also easily be adapted to any other object to impart opening and closing or waving of a portion of the object, such as opening and closing of a mouth of a human or animal figure, or flapping of wings of a bird figure. The movement of the hood 122 or other structure can also act as a trigger for other features of the object including but not limited to turning on and off lights, or making sounds. Alternatively magnet 126 could be an electromagnet mounted to the object or on an axle that is not connected to the wheels' axle where it can be controlled by a separate motor.

FIGS. 17-20 depict a method for a novelty design of a vehicle 140 that would appear to bounce as it rolls across a surface 154. Magnet 142 and guide post 144 are statically mounted to the chassis or body of vehicle 140. When wheel 146 rotates on axle 152, magnet 148 rotates. The polarity of magnet 148 is flipped when it is rotated alternating the force between magnets 142 and 148 from attraction to repulsion. The sleeve 150 moves along guide post 144 causing the body of vehicle 140 to lower, depicted in FIGS. 17 and 18, or raise, depicted in FIGS. 19 and 20, with respect to surface 154 when the force between magnets 142 and 148 changes from attraction to repulsion respectively. Sleeve 150 may contain bushings or bearings to reduce friction and is mounted in an orientation that allows sleeve 150 to slide freely along guide post 144. Sleeve 150 is mounted at a 90 degree angle to a second sleeve 151. Axle 152 rotates inside sleeve 151. Sleeve 151 may contain bushings or bearings to reduce friction.

The apparatus just described could be attached to the front axle, back axle or both. Each wheel could also have independent suspension and a separate assembly could be attached to each wheel. Any of a variety of suspension designs would yield similar results including but not limited to an A-arm, double A-arm, trailing arm, straight axle, McPherson strut, etc. Another design alternative would allow magnet 148 to be fixed to a non-rotating axle and magnet 142 would rotate to produce the alternating force. Magnets 142 or 148 could also be rotated utilizing a motor, solenoid, manual or other means. Magnets 142 or 148 could also be electromagnets allowing the manipulation of the magnetic field to be created by changing the direction and magnitude of the current. The apparatus could also easily be adapted to any other object; human, animal, or machine, and impart the appearance of bouncing or jumping of a portion of the object. The movement of the body of the vehicle 140 can also act as a trigger for other features of the object including but not limited to turning on and off lights, or sounds.

FIG. 21 depicts a vehicle 170 traveling along surface 172. Forward momentum will carry vehicle 170 with magnet 174, which is attached to the body or chassis, toward magnet 176. The orientation of magnets 174 and 176 produce a repellant force, with ample forward momentum the vehicle will overcome the repulsive force in horizontal direction, some fraction of the momentum will be transferred into vertical motion by the repulsive force between the two magnets and the vehicle will be forced airborne in a novel manner.

Manipulation of magnet 176 can enhance the movements of vehicle 170. For example, magnet 176 can be rotated about any axis to create various levels of attraction, torque and repulsion each causing different reactions by vehicle 170. The distance between magnet 176 and surface 172 can also be varied to provide various levels of attraction, torque and repulsion. Movement of magnet 176 can be generated by springs, levers, motors or other mechanical means and can be initiated by sensors in surface 172 or vehicle 170, levers or release mechanisms triggered by the vehicle or a user. It would be obvious to a designer that magnets 174 and 176 could also be electromagnets and provide similar effects and multiple magnets could be added to vehicle 170 to enhance the effect. The vehicle 170 could also easily be adapted to any other form; human, animal, or machine.

FIG. 22 depicts a method to accelerate vehicle 180 by transferring momentum from an apparatus containing a movable magnet 186 through an attractive force between magnet 184 and 186. Magnet 186 is moved in any direction, pulling vehicle 180 with it along surface 182. It is apparent that if magnets 184 and 186 are aligned in a manner that creates a repulsive force, vehicle 180 could be pushed by an apparatus that contains magnet 186, which is oriented as shown in the figure.

FIG. 23 depicts a method to impart novel movement to an object 200. Object 200 contains magnets 202 and 204 that interact with magnets 206 and 208 under surface 210. Magnets 206 and 208 can be rotated quickly to switch the direction of the magnetic fields and the force between magnets 202 and 206, and 204 and 208 to switch from attractive to repulsive, object 200 will jump off surface 210. Rotating magnets 206 and 208 again will change the force between magnets 202 and 206, and 204 and 208 to switch back to attractive causing board 200 to rest on surface 210. Twisting magnets 206 and 208 along different axis will cause board 200 to jump and twist in novel ways. Magnets 206 and 208 can be manipulated manually, with motors, or solenoids for example, or magnets 206 and 208 can be electromagnets, thus allowing their magnetic fields to be altered by changing the direction and magnitude of the current flowing through the coils. Through practice, a user could learn to cause the object 200 to move with controlled actions of jumps, flips and twists providing entertainment value to the apparatus. A single magnet could be mounted in object 200 or additional magnets could be placed throughout object 200 to create different interaction of the object 200 with one or more magnets under surface 210. It would be apparent to a skilled designer of consumer products that object 200 can be a variety of objects including but not limited to a human or animal figure, vehicle, skateboard, snowboard, or wakeboard.

Figure 24:
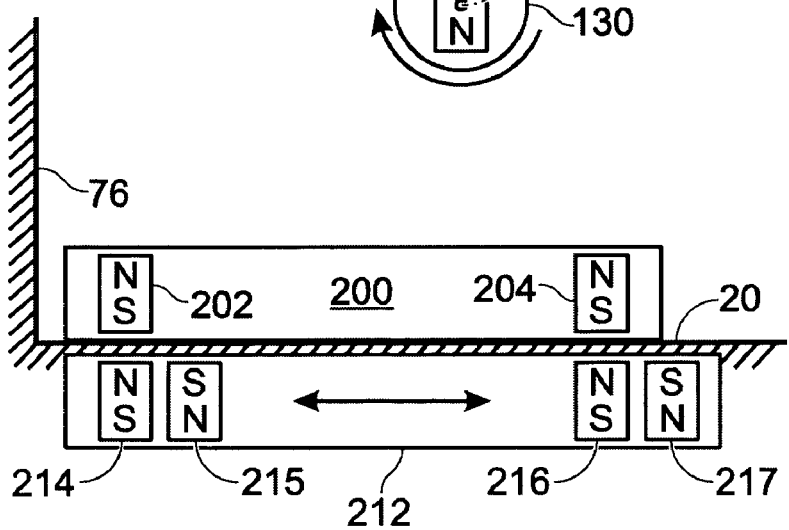
Figure 17:
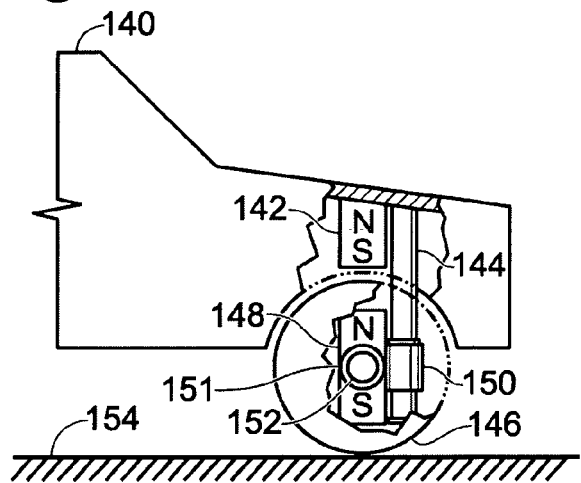
Figure 18:
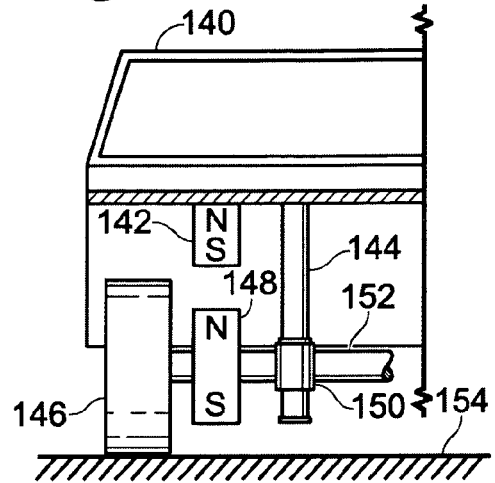
Figure 19:
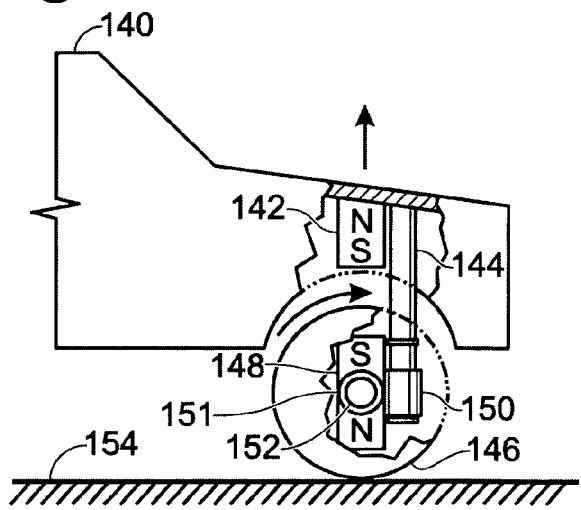
Figure 20:
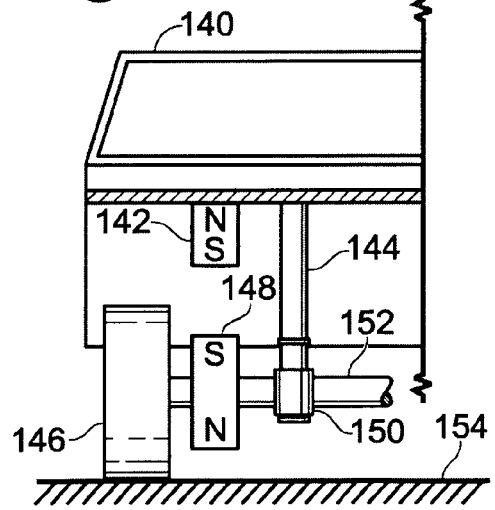

FIG. 24 depicts an alternative method to create upward movement of object 200. Object 200 contains magnets 202 and 204 on or under its surface creating an attractive force between magnets 214 and 216 within object 212. When object 212 is moved to the left, object 200 moves until it reaches vertical structure 76, if object 212 continue to move to the left, magnets 202 and 204 will line up with magnets 215 and 217 creating a repulsive force and upward movement. It would be apparent to someone skilled in the art of product design that any number of magnet sets similar in arrangement to a set defined as magnets 202, 214, 215, would produce a similar effect.

FIG. 25 depicts a method to move object 200 embedded with magnets 202 and 204 forward or backwards along surface 220 utilizing a linear array of magnets 222 rotatable upon an axis perpendicular to the direction of travel of object 200. By rotating magnets 222 the magnetic field is alter and object 200 can be flipped or slid resulting in linear travel forward or backwards. An operator will require experience to optimize the speed of object 200, thus increasing the entertainment value of the device. Two or more linear arrays of magnets 222 could be aligned side by side to produce a racing system. Magnet array 222 can be manipulated manually, with motors, solenoids, or magnet array 222 can be electromagnets allowing their magnetic fields to be altered by changing the direction and magnitude of the current flowing through the coils. A single magnet could be mounted in object 200 or additional magnets could be placed through out object 200 to create different interaction of the object 200 with one or more magnets under surface 220.

Figure 26:
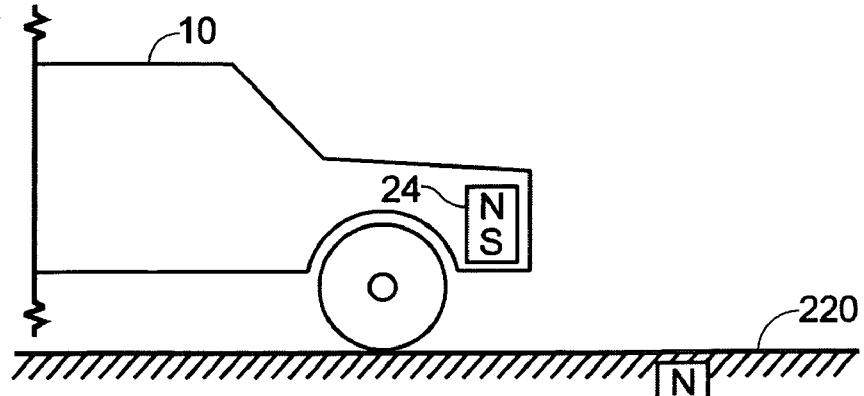
FIGS. 26 and 27 are diagrams illustrating how magnetic fields are manipulated in accordance with another aspect of the present invention for accelerating an object that is, preferably, embodied as a vehicle.
Figure 27:
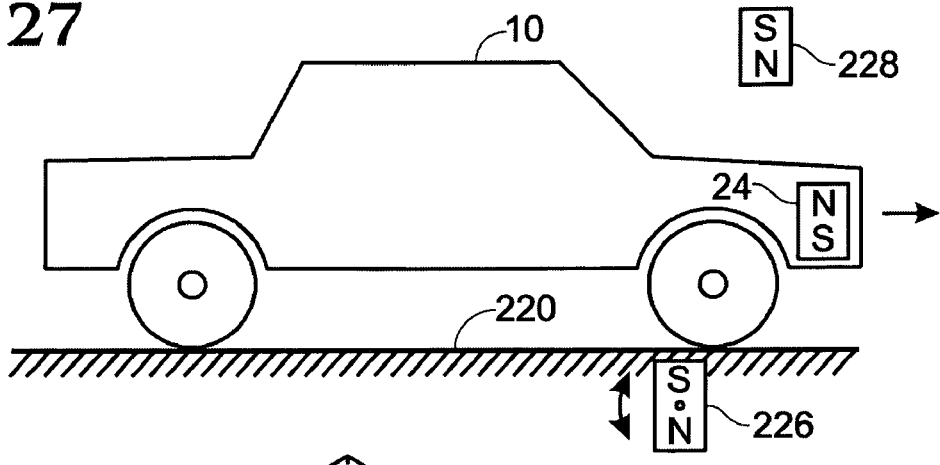

FIGS. 26 and 27 depict a method to impart acceleration to vehicle 10. Vehicle 10 containing magnet 24 travels on surface 220 towards magnet 226. Magnet 226 is mounted on an axle in a manner that allows it to spin around an axis that is perpendicular to the plane of the figures. In the orientation depicted in FIG. 26, magnet 226 is positioned slightly counterclockwise of vertical, and there is a mechanism, such as a ratchet, that does not allow it to rotate further in the counterclockwise direction. There is a repulsive force between magnets 226 and an adjacent, fixed magnet 228. An attractive force exists between magnet 24 and rotatable magnet 226. When magnet 226 contained by vehicle 10 passes magnet 226 (as the vehicle moves from left to right in FIG. 26), the attractive force causes magnet 226 to rotate in the clockwise direction past vertical. The magnetic field created by magnet 228 on 226 will cause magnet 226 to rotate rapidly to the position depicted in FIG. 27. In the orientation depicted in FIG. 27 a repulsive force exists between magnet 24 and magnet 226 that causes vehicle 10 to accelerate away from the magnet 226. A linear array of magnets 226 and 228 oriented in the direction of travel of vehicle 10 will enhance the just-described acceleration effect on vehicle 10.

Figure 28:
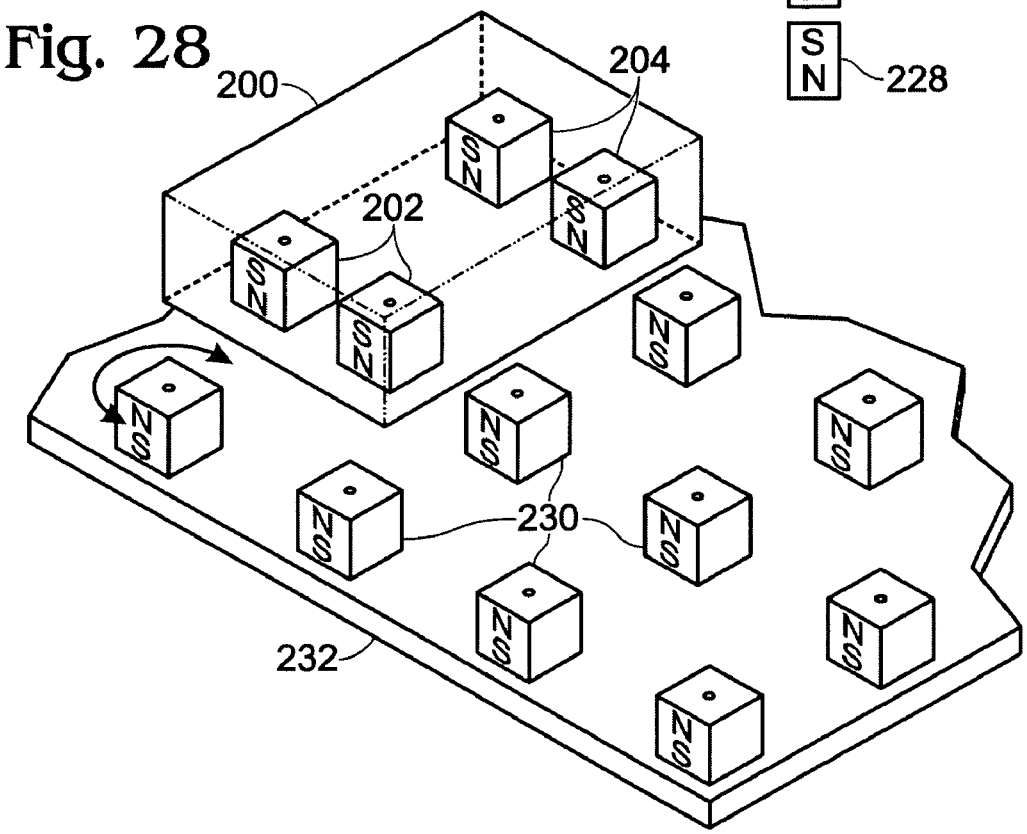
FIG. 28 is a diagram for illustrating another method for moving an object by altering magnetic fields.

FIG. 28 depicts a method to impart movement to object 200. Magnets in magnet array 230 are rotated about one or more axes to impart various movements of object 200 on surface 232. Magnet array 230 can be manipulated manually, or with motors, solenoids etc. Also, magnet array 230 can be formed of electromagnets, thereby allowing their magnetic fields to be altered by changing the direction and magnitude of the current flowing through the coils. A single magnet could be mounted in object 200 or additional magnets could be placed through out object 200 to create different interactions of object 200 with one or more magnets under surface 220.

Levers, buttons, motors or other devices can control magnet array 230. Control of magnet array 230 can be by one or more users to attempt moving object 200 in a controlled manner from one location to another or a goal to score points. Magnet array 230 can also be controlled by an automated system causing the movement of object 230 to appear random. The movement random movement of object 230 can be of novel design strictly for appearance, or part of a game where players try to capture object 230 with nets, lines holding magnets or other means. A multitude of objects 200 can be placed on surface 232 and interact with magnet array 230 and other objects 200 for an additional novel effect or enhancement of a game to catch objects 200. Surface 232 can be flat or have a varied surface elevation to enhance the interaction of array 230 and object 200. Surface elevations can be simple geometric features or aesthetic surfaces including but not limited to waves in water, mountain peaks, or grass hills.

The invention claimed is:

1. A levitated-object assembly, comprising:
   an object having a proximal end and a distal end and a first magnetic element attached thereto;
   a base;
   support means for attracting together into contact the base and the proximal end of the object;
   the base having two spaced-apart magnet elements carried thereon and arranged to repel the first magnetic element so that the distal end of the object is levitated relative to the base; and
   wherein the support means includes a channel defined in the base and into which fits a part of the object near the proximal end thereby to align the distal end of the object in a predetermined, centered location relative to the base.

2. A levitated-object assembly, comprising:
   an object having a proximal end and a distal end and a first magnetic element attached thereto;
   a base;
   support means for attracting together into contact the base and the proximal end of the object;
   the base having two spaced-apart magnet elements carried thereon and arranged to repel the first magnetic element so that the distal end of the object is levitated relative to the base;
   wherein the support means also includes a base magnet attached to the base and an object magnet attached to the proximal end of the object, the base and object magnets being attached so that the attractive forces between the base magnet and object magnet tend to move the distal end of the object into the predetermined, centered location relative to the base.

3. The assembly of claim 2 wherein the proximal end of the object and the base are configured to permit relative motion therebetween while maintaining contact.

4. The assembly of claim 3 wherein the support means includes a hook on the base and a peg on the proximal end of the object.

5. The assembly of claim 2 further comprising a fulcrum member attached to and extending from the base and into contact with the object between the distal and proximal ends thereof.

6. The assembly of claim 5 wherein the fulcrum member is shaped to permit oscillating rotational motion of the object about the fulcrum member.

7. The assembly of claim 6 wherein the support magnet, first magnetic element, and two spaced-apart magnetic elements as well as the fulcrum member are arranged so that the direction of rotation of the object in response to the levitation force is opposite to the direction of rotation of the board in response to force of the support magnet.

8. The assembly of claim 6 wherein the support magnet, first magnetic element, and two spaced-apart magnetic elements as well as the fulcrum member are arranged so that the direction of rotation of the object in response to the levitation force is the same as the direction of rotation of the board in response to force of the support magnet.

9. The assembly of claim 2 wherein the support means includes at least one torus shaped magnet arranged to permit rotation of the proximal end about the location where that end contacts the base.

10. A method of supporting an object that has a distal end and a proximal end so that the distal end is levitated, comprising the steps of:
    magnetically attracting the proximal end of the object into contact with a base in manner that permits movement of the mounted object relative to the base; and
    levitating the distal end of the object;
    wherein the levitating step includes forming a valley-shaped magnetic field for supporting the distal end of the object;
    wherein the forming step includes locating two spaced-apart magnets in the base; and
    wherein the levitating step further comprises the step of providing a magnetic element near the distal end of the object with the polarity of the magnetic element oriented to match that of the valley-shaped magnetic field.

11. The method of claim 10 further comprising the step of shaping the base to include a fulcrum member that extends for pivotal contact with the object between its proximal and distal ends.

12. A method of supporting an object that has a distal end and a proximal end so that the distal end is levitated, comprising the steps of:
    magnetically attracting the proximal end of the object into contact with a base in manner that permits movement of the mounted object relative to the base; and
    levitating the distal end of the object;
    wherein the levitating step includes forming a valley-shaped magnetic field for supporting the distal end of the object; and
    including the step of arranging at least two magnets near the proximal end of the object in a manner such that the object is urged into an alignment that places the distal end of the object in the valley-shaped magnetic field.

13. The method of claim 12 wherein the forming step includes locating two spaced-apart magnets in the object.

* * * * *